(12) United States Patent
Sawabe et al.

(10) Patent No.: US 11,516,274 B2
(45) Date of Patent: Nov. 29, 2022

(54) VIDEO PLAYBACK BIT RATE ESTIMATION DEVICE AND METHOD, NON-TRANSITORY COMPUTER-READABLE MEDIUM CONTAINING PROGRAM, AND COMMUNICATION QUALITY MEASUREMENT DEVICE

(71) Applicant: NEC CORPORATION, Tokyo (JP)

(72) Inventors: Anan Sawabe, Tokyo (JP); Takanori Iwai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 171 days.

(21) Appl. No.: 16/642,968

(22) PCT Filed: May 23, 2018

(86) PCT No.: PCT/JP2018/019758
§ 371 (c)(1),
(2) Date: Feb. 28, 2020

(87) PCT Pub. No.: WO2019/044065
PCT Pub. Date: Mar. 7, 2019

(65) Prior Publication Data
US 2020/0195703 A1    Jun. 18, 2020

(30) Foreign Application Priority Data
Aug. 30, 2017 (JP) .............................. JP2017-165280

(51) Int. Cl.
*H04L 65/80* (2022.01)
*H04L 43/0888* (2022.01)
(Continued)

(52) U.S. Cl.
CPC .......... *H04L 65/80* (2013.01); *H04L 43/0888* (2013.01); *H04L 43/16* (2013.01); *H04L 65/60* (2013.01)

(58) Field of Classification Search
CPC ..... H04L 65/80; H04L 43/0888; H04L 43/16; H04L 65/60; H04L 41/069;
(Continued)

(56) References Cited

U.S. PATENT DOCUMENTS

2018/0027293 A1*  1/2018  Yamamoto .............. G06F 13/00
725/86

FOREIGN PATENT DOCUMENTS

JP   2008-301309 A   12/2008
JP   2011-130176 A    6/2011
(Continued)

OTHER PUBLICATIONS

Yi Sun et al., CS2P: Improving Video Bitrate Selection and Adaptation with Data-Driven Throughput Prediction, Aug. 22-26, 2016, SIGCOMM '16 (Year: 2016).*

(Continued)

*Primary Examiner* — Soe Hlaing

(57) ABSTRACT

A throughput division means (11) divides a throughput of a communication between a video delivery server configured to deliver, in a plurality of delivery modes, video data to a user terminal device used by a user and the user terminal device in a delivery period of the video data, according to a period of each delivery mode. A playback bit rate estimation means (12) estimates a playback bit rate of the video data, based on a throughput divided according to a period of the delivery mode. Thus, estimation precision of a video playback bit rate can be improved even when a video delivery server delivers video data in a plurality of delivery modes.

15 Claims, 9 Drawing Sheets

(51) Int. Cl.
  *H04L 43/16*    (2022.01)
  *H04L 65/60*    (2022.01)
(58) Field of Classification Search
  CPC ............. H04L 41/5067; H04L 65/4084; H04L 65/602; H04N 17/00; H04N 21/238; G06F 13/00
  See application file for complete search history.

(56) References Cited

FOREIGN PATENT DOCUMENTS

| JP | 2017-076892 A | 4/2017 |
| WO | 2017090178 A1 | 6/2017 |

OTHER PUBLICATIONS

Xiaoqi Yin et al., A Control-Theoretic Approach for Dynamic Adaptive Video Streaming over HTTP, Aug. 17-21, 2015, SIGCOMM '15 (Year: 2015).*

International Search Report (PCT/ISA/210) dated Aug. 14, 2018 issued by the International Searching Authority in International Application No. PCT/JP2018/019758.

* cited by examiner

VIDEO PLAYBACK BIT RATE ESTIMATION DEVICE AND METHOD, NON-TRANSITORY COMPUTER-READABLE MEDIUM CONTAINING PROGRAM, AND COMMUNICATION QUALITY MEASUREMENT DEVICE

TECHNICAL FIELD

The present invention relates to a video playback bit rate estimation device, a method, and a program, and more specifically relates to a video playback bit rate estimation device, a method, and a program that estimate a playback bit rate of video data at a user terminal device receiving delivery of the video data.

Further, the present invention relates to a communication quality measurement device including such a video playback bit rate estimation device.

BACKGROUND ART

With sophistication of communication services, a performance indicator of a carrier is shifting from quality of service (QoS) such as a throughput to quality of experience (QoE) of a user. The International Telecommunication Union Telecommunication Standardization Sector (ITU-T) disclosed a latest standard of a video QoE model (P.1203) in November, 2016. P.1203 defines a quality of experience model of a user at video browsing.

In order to calculate video QoE, a playback rate (playback bit rate) of the video needs to be measured. However, information about a playback rate can be acquired only from a user terminal device, and a playback rate cannot be directly measured from, for example, a communication log available to a carrier or the like. With respect to the problem, Patent Literature 1 discloses measuring a communication rate (throughput) of a communication packet and estimating a playback bit rate, based on the measured communication rate. Specifically, an average communication rate during video playback is measured according to Patent Literature 1. Patent Literature 1 describes estimating, as a playback bit rate, the maximum playback bit rate within a range not exceeding an average communication rate, out of playback bit rates that can be provided by a video delivery server.

CITATION LIST

Patent Literature

Patent Literature 1: International Patent Publication No. WO 2017/090178

SUMMARY OF INVENTION

Technical Problem

In Patent Literature 1, an average communication rate during video playback is generally assumed to be equal to a playback bit rate. An average communication rate is calculated by dividing a data amount of downloaded video data by a communication time. However, when the communication time deviates from the video playback time, there is a problem that precision of an estimated value of a playback rate is low in a method of simply assuming the average communication rate as the playback rate. For example, when video data with a data amount of 20 megabytes (MB) and a video playback time of 2 minutes is downloaded in 1 minute, an average communication rate becomes 20 MB/minute. On the other hand, an actual playback rate becomes 20 MB/2 minutes=10 MB/minute, and therefore the estimated playback rate significantly differs from the actual playback rate.

Further, some video delivery servers deliver video data in a plurality of delivery modes. For example, YouTube (registered trademark) has two delivery modes being an initial burst in which a large amount of data are downloaded at the start of a video playback and throttling in which data are downloaded periodically. In that case, it is considered that, for example, when assuming an average communication rate in an entire period of a communication time to be a playback rate without considering the difference of the delivery modes, the estimated playback rate significantly deviates from an actual playback rate.

In view of the aforementioned circumstances, an example object of the present invention is to provide a video playback bit rate estimation device, a method, and a program, and a communication quality measurement device that are capable of improving estimation precision of a video playback bit rate even when a video delivery server delivers video data in a plurality of delivery modes.

Solution to Problem

In order to resolve the aforementioned problem, an example aspect of the present invention provides a video playback bit rate estimation device including: a throughput division means for dividing a throughput of a communication between a video delivery server configured to deliver video data to a user terminal device in a plurality of delivery modes and the user terminal device in a delivery period of the video data, according to a period of each delivery mode; and a playback bit rate estimation means for estimating a playback bit rate of the video data, based on a throughput divided according to a period of a delivery mode.

An example aspect of the present invention also provides a communication quality measurement device including: a throughput division means for dividing a throughput of a communication between a video delivery server configured to deliver video data to a user terminal device in a plurality of delivery modes and the user terminal device in a delivery period of the video data, according to a period of each delivery mode; a playback bit rate estimation means for estimating a playback bit rate of the video data, based on a throughput divided according to a period of the delivery mode; a parameter estimation means for estimating a medium resolution, a medium length, and playback interruption information of the video data, based on the estimated playback bit rate; and a QoE calculation means for calculating quality of experience (QoE) of a user of the user terminal device by use of the estimated playback bit rate, and the estimated medium resolution, medium length, and playback interruption information.

Furthermore, an example aspect of the present invention provides a video playback bit rate estimation method including: dividing a throughput of a communication between a video delivery server configured to deliver video data to a user terminal device in a plurality of delivery modes and the user terminal device in a delivery period of the video data, according to a period of each delivery mode; and estimating a playback bit rate of the video data, based on a throughput divided according to a period of the delivery mode.

An example aspect of the present invention provides a program causing a computer to execute processing for: dividing a throughput of a communication between a video delivery server configured to deliver video data to a user terminal device in a plurality of delivery modes and the user terminal device in a delivery period of the video data, according to a period of each delivery mode; and estimating a playback bit rate of the video data, based on a throughput divided according to a period of the delivery mode.

Advantageous Effects of Invention

A video playback bit rate estimation device, a method, and a program, and a communication quality measurement device, according to an example aspect of the present invention, are capable of improving estimation precision of a video playback bit rate even when a video delivery server delivers video data in a plurality of delivery modes.

DESCRIPTION OF EMBODIMENTS

Figure 1:
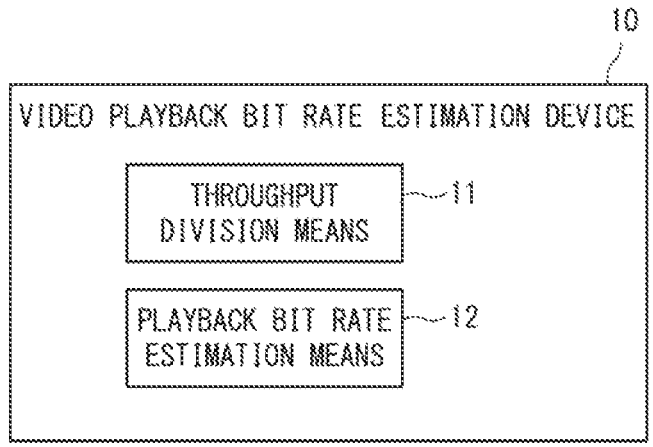
FIG. 1 is a block diagram illustrating an outline of a video playback bit rate estimation device according to an example aspect of the present invention.

Prior to description of example embodiments of the present invention, an overview of the example embodiments will be described. FIG. 1 illustrates an outline of a video playback bit rate estimation device according to an example aspect of the present invention. The video playback bit rate estimation device 10 includes a throughput division means 11 and a playback bit rate estimation means 12.

An unillustrated video delivery server delivers video data to a user terminal device used by a user in a plurality of delivery modes. The throughput division means 11 divides a throughput of a communication between the video delivery server and the user terminal device in a video data delivery period, according to a period of each delivery mode. The playback bit rate estimation means estimates a playback bit rate of the video data, based on the throughput divided according to a period of a delivery mode.

In an example aspect of the present invention, a throughput in an entire delivery period of video data is divided according to a period of each delivery mode. When video data are delivered in a plurality of delivery modes, it is considered that precision of a playback bit rate estimated from a throughput in a period in which video delivery is performed in one delivery mode may be high while precision of a playback bit rate estimated from a throughput in a period in which video delivery is performed in another delivery mode may be low. In an example aspect of the present invention, a throughput in a video delivery period is divided according to a period of each delivery mode, and for example, a playback bit rate may be estimated by use of a divided throughput in a period of a delivery mode providing high estimation precision of a playback bit rate. Thus, estimation precision of a video playback bit rate at a user terminal device can be improved.

Figure 2:
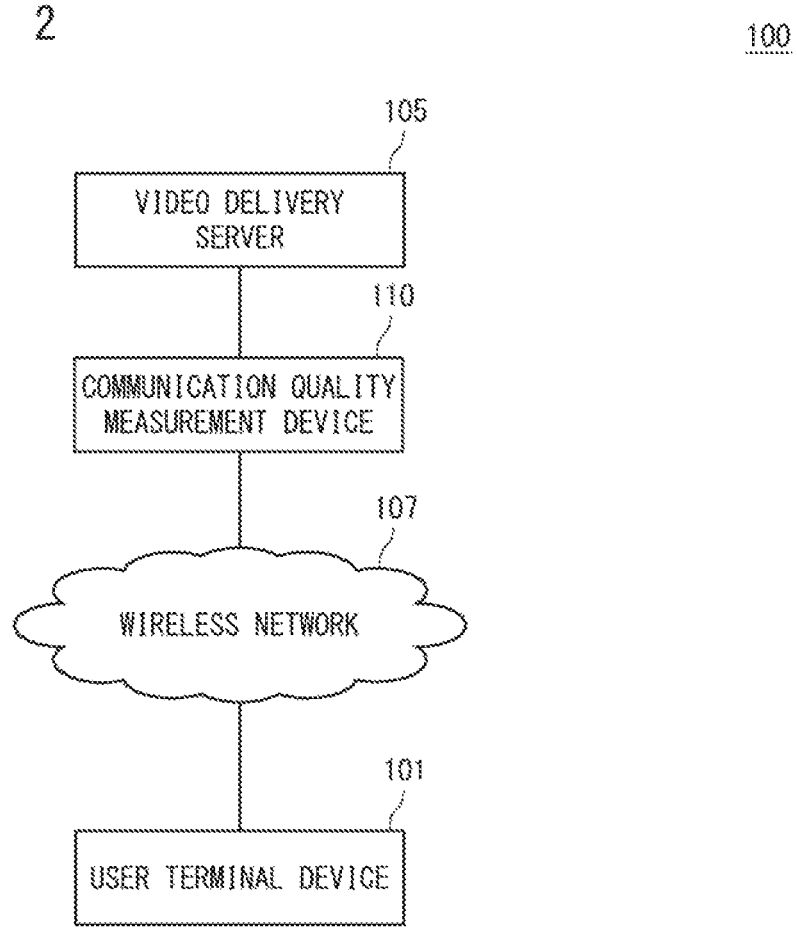
FIG. 2 is a block diagram illustrating a communication system including a communication quality measurement device according to a first example embodiment of the present invention.

Referring to drawings, the example embodiments of the present invention will be described in detail below. FIG. 2 illustrates a communication system including a communication quality measurement device according to a first example embodiment of the present invention. The communication system 100 includes a user terminal device 101, a video delivery server 105, a wireless network 107, and a communication quality measurement device 110. While only one user terminal device 101 is illustrated in FIG. 2, the communication system 100 may include a plurality of user terminal devices 101.

The user terminal device 101 is a terminal device used by a user. The user terminal device 101 has a function of connecting to the wireless network 107. For example, the wireless network 107 is a wireless communication network such as a mobile network (cellular network) and the user terminal device 101 is a cellular phone connectable to the mobile network. For example, the wireless network 107 may be a wireless communication network such as WiFi or a low power wide area (LPWA), and the user terminal device 101 may be a device connectable to such a wireless communication network.

The video delivery server 105 is a server delivering video data. The video delivery server 105 delivers video data in a plurality of delivery modes. The plurality of delivery modes include a first delivery mode in which the video delivery server 105 continuously receive a plurality of video delivery requests from the user terminal device 101 and a second delivery mode in which the video delivery server 105 receives video delivery requests at time intervals longer than time intervals at which a plurality of video delivery requests are received from the user terminal device 101 in the first delivery mode.

For example, the video delivery server 105 delivers video data in the aforementioned first delivery mode at the start of video data delivery and subsequently delivers the video data in the second delivery mode. For example, video data are divided into a plurality of chunks, and the video delivery server 105 delivers the video data to the user terminal device 101 on a per chunk basis. An example of performing video delivery by the video delivery server 105 in the aforementioned two delivery modes will be mainly described below. However, the number of delivery modes is not limited to two, and the video delivery server 105 may perform video delivery in three or more delivery modes.

The user terminal device 101 and the video delivery server 105 transmit and receive communication packets through the wireless network 107 and the communication quality measurement device 110. A communication between the user terminal device 101 and the video delivery server 105 may be encrypted. The communication quality measurement device 110 estimates a video playback bit rate, based on information about communication packets transmitted and received between the user terminal device 101 and the video delivery server 105. Further, based on the estimated video playback bit rate, the communication quality measurement device 110 calculates a communication performance indicator, such as QoE.

Figure 3:
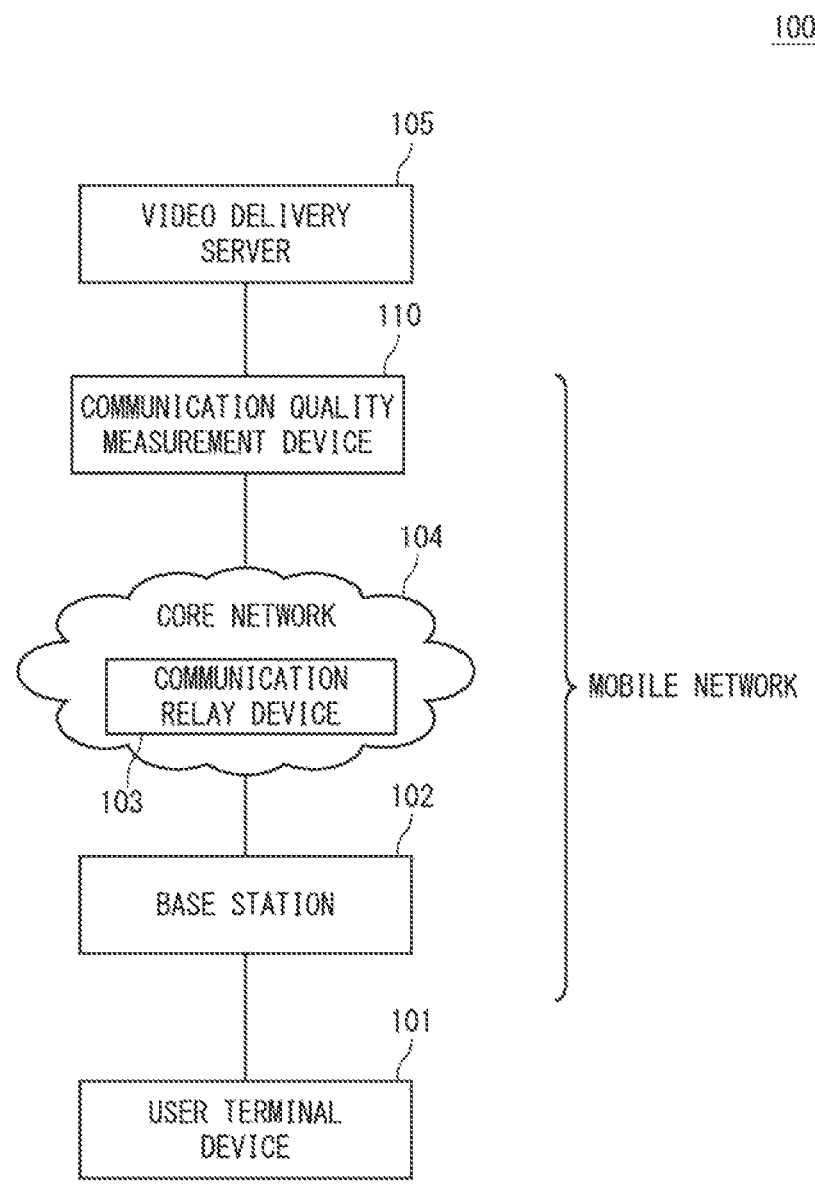
FIG. 3 is a block diagram illustrating details of the communication system.

FIG. 3 illustrates the communication system illustrated in FIG. 2 in more detail. In this example, the wireless communication network 107 (see FIG. 2) includes a base station 102 and a core network 104. The base station 102 is connected to the user terminal device 101 and the core network 104. The base station 102 performs wireless communication with the user terminal device 101.

The video delivery server 105 is connected to the core network 104 through the communication quality measurement device 110. The core network 104 includes a communication relay device 103. The communication relay device 103 relays communication between the user terminal device 101 and the video delivery server 105. The communication relay device 103 relays communication packets transmitted from the user terminal device 101 side to the video delivery server 105 side and communication packets transmitted from the video delivery server 105 side to the user terminal device 101 side. The communication relay device 103 includes mobile edge computing.

In the core network 104, the communication relay device 103 acquires a communication log of a communication between the user terminal device 101 and the video delivery server 105. For example, the communication relay device 103 stores transmission control protocol (TCP) based and hyper text transfer protocol (HTTP) based communication packets into an unillustrated communication log storage unit, as a communication log. For example, the communication quality measurement device 110 acquires, from the communication relay device 103, a communication log being related to video data delivery and being transmitted and received between the user terminal device 101 and the video delivery server 105. The communication quality measurement device 110 estimates a video playback bit rate, based on the acquired communication log, and calculates QoE, based on the estimated video playback bit rate.

While FIG. 3 illustrates an example of the video delivery server 105 being directly connected to the core network 104 through the communication quality measurement device 110, the connection is not limited to the example above. For example, the video delivery server 105 may be connected to the core network 104 further through the Internet or the like. For example, the base station 102, the communication relay device 103, and the core network 104 are managed and operated by a carrier providing the mobile network.

Figure 4:
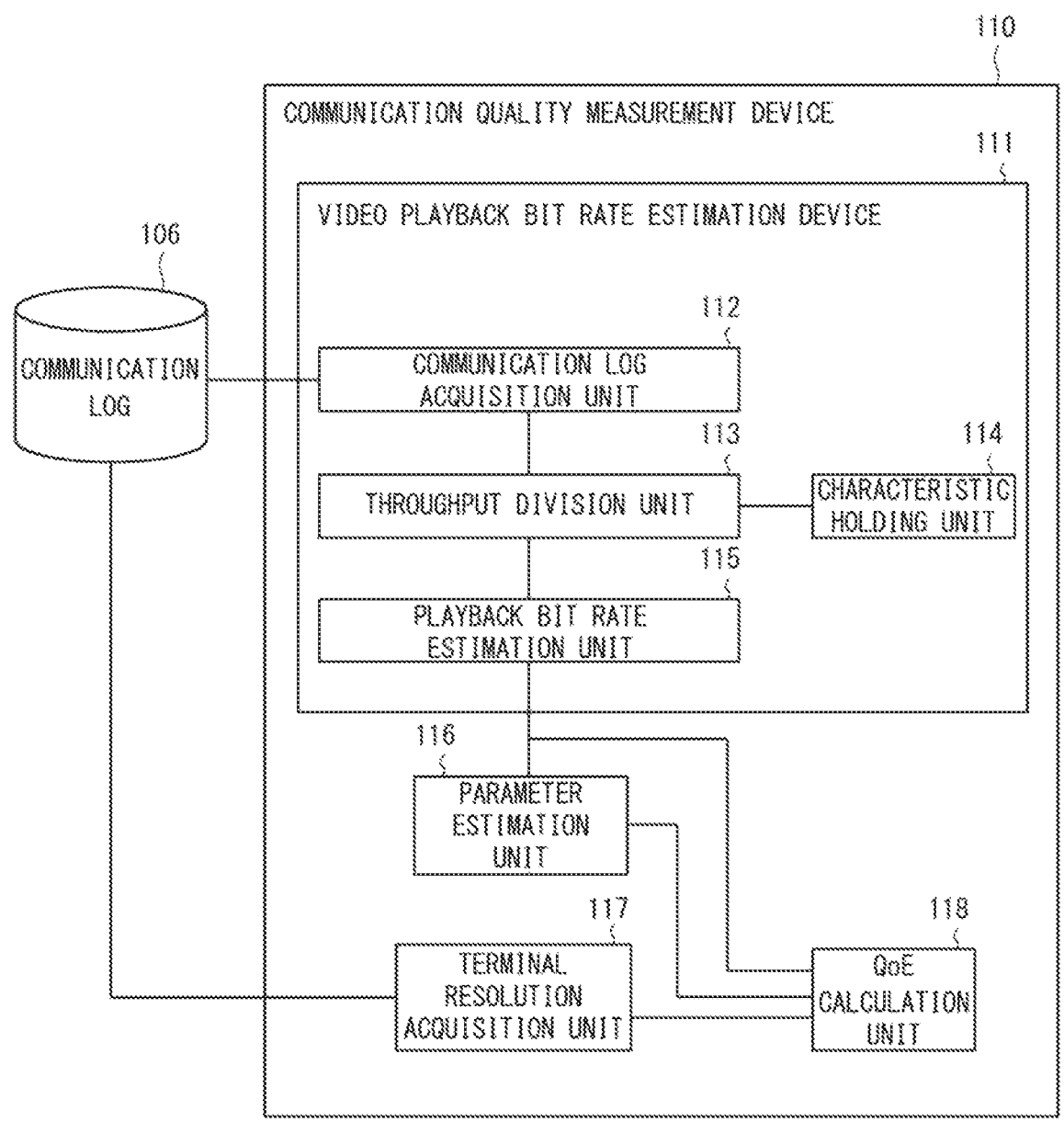
FIG. 4 is a block diagram illustrating a configuration of a communication quality measurement device.

FIG. 4 illustrates a configuration of the communication quality measurement device 110. The communication quality measurement device 110 includes a video playback bit rate estimation device 111, a parameter estimation unit 116, a terminal resolution acquisition unit 117, and a QoE calculation unit 118. The video playback bit rate estimation device 111 includes a communication log acquisition unit 112, a throughput division unit 113, a characteristic holding unit 114, and a playback bit rate estimation unit 115. A function of each unit in the communication quality measurement device 110 and the video playback bit rate estimation device 111 may be provided by, for example, a computer device including a processor operating in accordance with a program read from a memory.

For example, the communication log storage unit 106 is an external storage device such as a hard disk device and stores a communication log of a communication relayed by the communication relay device 103. For example, when relaying TCP-based and HTTP-based communication packets, the communication relay device 103 stores the relayed communication packets into the communication log storage unit 106. The communication log acquisition unit 112 acquires a communication log of a communication between the video delivery server 105 (see FIG. 2 and FIG. 3) and the user terminal device 101 from the communication log storage unit 106.

For example, based on address information included in a communication log, the communication log acquisition unit 112 acquires, from the communication log storage unit 106, communication packets transmitted and received between the user terminal device 101 and the video delivery server 105. When communication logs of a plurality of user terminal devices 101 are stored in the communication log storage unit 106, the communication log acquisition unit 112 acquires a communication log for each combination of an address of a user terminal device 101 and an address of the video delivery server 105.

The throughput division unit 113 refers to a communication log acquired by the communication log acquisition unit 112 and divides a throughput in a delivery period of video data, according to a period of each delivery mode. For example, the throughput division unit 113 divides a throughput in a video delivery period, according to a period of each delivery mode, based on a characteristic of a communication traffic pattern between the video delivery server 105 and the user terminal device. For example, the characteristic holding unit 114 is configured as a memory such as a random access memory (RAM) or a read only memory (ROM) and for example, holds a characteristic of communication traffic for identifying each delivery mode. The throughput division unit 113 divides a throughput in a video delivery period, according to a period of each delivery mode, with reference to the characteristic holding unit 114. The throughput division unit 113 corresponds to the throughput division means 11 in FIG. 1.

The playback bit rate estimation unit 115 estimates a playback bit rate of video data at the user terminal device 101, based on a throughput divided by the throughput division unit 113. For example, the throughput division unit 113 divides a throughput in a period of a delivery mode with the maximum correlation with an actual playback bit rate of video data out of a plurality of delivery modes. The playback bit rate estimation unit 115 estimates a playback bit rate, based on the divided throughput in the period in the delivery mode with the maximum correlation with the actual playback bit rate of the video data. The playback bit rate estimation unit 115 corresponds to the playback bit rate estimation means 12 in FIG. 1.

Based on a playback bit rate estimated by use of the video playback bit rate estimation device 111, the parameter estimation unit 116 estimates parameters being different from the playback bit rate and being used for QoE calculation. Specifically, for example, the parameter estimation unit 116 estimates a medium resolution, a medium length, and playback interruption information of video data. For example, a medium resolution is represented by an image size of video data in a longitudinal direction, the video data being displayed at a predetermined aspect ratio. Further, a medium length indicates a playback time of video data. For example, playback interruption information is information indicating a length and a frequency of a playback interruption state. Estimation techniques of the parameters will be described later.

The terminal resolution acquisition unit 117 acquires a resolution (terminal resolution) of a display screen on the user terminal device 101. For example, the terminal resolution acquisition unit 117 refers to the communication log storage unit 106 and acquires user agent information included in a communication packet transmitted by the user terminal device 101. The terminal resolution acquisition unit 117 specifies a model of the user terminal device 101 and the like from the acquired user agent information and acquires a terminal resolution of the user terminal device 101 with reference to a terminal database storing a terminal resolution of each model, or the like.

When a communication between the user terminal device 101 and the video delivery server 105 is encrypted, the terminal resolution acquisition unit 117 cannot acquire user agent information from a communication log between the user terminal device 101 and the video delivery server 105. In such a case, for example, the terminal resolution acquisition unit 117 may acquire user agent information from a non-encrypted communication packet transmitted from the user terminal device 101 to another server or the like.

The QoE calculation unit 118 calculates video QoE of a user of the user terminal device 101 by use of a playback bit rate estimated by the video playback bit rate estimation device 111, a medium resolution, a medium length, and playback interruption information that are estimated by the parameter estimation unit 116, and a terminal resolution acquired by the terminal resolution acquisition unit 117. For example, when the terminal resolution acquisition unit 117 cannot acquire user agent information and thus cannot acquire a terminal resolution, the QoE calculation unit 118 may calculate video QoE assuming that the terminal resolution is a predetermined resolution.

Figure 5:
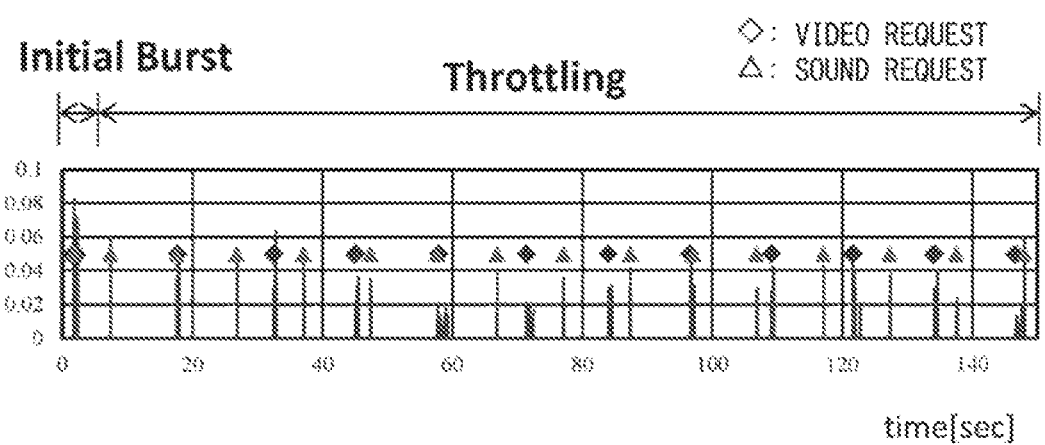
FIG. 5 is a graph illustrating a relation between a communication time and a throughput in video data delivery.

Division of a throughput and estimation of a playback bit rate will be described below. FIG. 5 illustrates a relation between a communication time and a throughput in delivery of certain video data. Further, FIG. 5 also illustrates timings of requests transmitted from the user terminal device 101 to the video delivery server 105. In FIG. 5, the horizontal axis represents a communication time from the communication start, and the vertical axis represents a throughput at each time. Further, in FIG. 5, a video request is plotted with a rhombus, and a sound request is plotted with a triangle. For example, the user terminal device 101 transmits a request to the video delivery server 105 on a per video data chunk basis.

For example, in a video delivery service such as YouTube (registered trademark), the video delivery server 105 delivers video data in two delivery mode being an initial burst and throttling. In an initial burst, the video delivery server 105 continuously receives requests and continuously transmits requested video data (chunk) to the user terminal device 101. By video data continuously transmitted to the user terminal device 101, the video data are buffered in the user terminal device 101.

In the example in FIG. 5, the video delivery server 105 switches the delivery mode to throttling after an elapse of about 5 seconds from the communication start. In throttling, the video delivery server 105 limits the number of requests received per unit time and discretely receives requests. As illustrated in FIG. 5, communication traffic patterns differ between the initial burst and the throttling.

Figure 6:
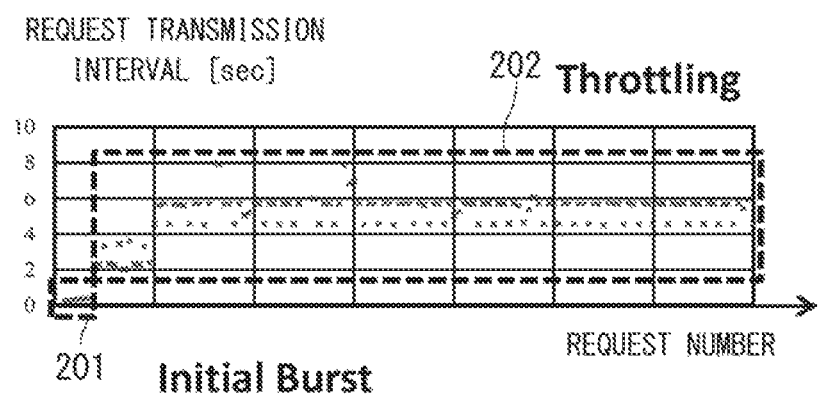
FIG. 6 is a graph illustrating transmission intervals between requests transmitted from a user terminal device when video data are delivered.

FIG. 6 illustrates transmission intervals of requests transmitted from the user terminal device 101 to the video delivery server 105 when certain video data are delivered. In FIG. 6, the horizontal axis represents a request number, and the vertical axis represents a transmission interval between requests. When i denotes an integer equal to or greater than 1, a transmission interval between requests is defined as the difference between a transmission time of an i-th request and a transmission time of an (i–1)-th request. In FIG. 6, a region 201 represents a region in which requests transmitted in an initial burst exist, and a region 202 represents a region in which requests transmitted in throttling exist.

The video delivery server 105 continuously receives requests in the initial burst period. Consequently, transmission intervals between requests existing in the region 201 are short. On the other hand, the video delivery server 105 discretely receives requests in the throttling period. Consequently, transmission intervals between requests existing in the region 202 are longer than the transmission intervals between requests in the initial burst period. Accordingly, it is considered that an initial burst period and a throttling period can be distinguished by using transmission intervals between requests.

Figure 7:
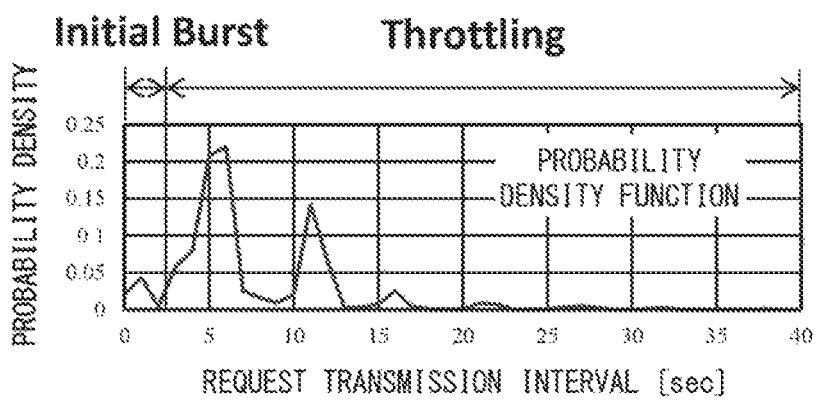
FIG. 7 is a graph illustrating a relation between a transmission interval between requests and a probability density.

FIG. 7 illustrates a relation between a transmission interval between requests and a probability density. In FIG. 7, the horizontal axis represents a transmission interval between requests, and the vertical axis represents a probability density. The present inventors checked request transmission intervals in an initial burst period and request transmission intervals in a throttling period for 1000 video titles and acquired a probability density function illustrated in FIG. 7. From the probability density function in FIG. 7, a conclusion that may be determined to a transmission interval between requests being equal to or less than 2 seconds may be determined to indicate an initial burst period, and a transmission interval between requests being greater than 2 seconds may be determined to indicate a throttling period has been acquired.

When a communication between the user terminal device 101 and the video delivery server 105 is encrypted, information acquirable from a communication log at the communication relay device 103 is limited to a 5-tuple (a source IP address, a source port number, a destination IP address, a destination port number, and a protocol) and a traffic pattern. Accordingly, even reference to a communication log does not tell whether or not a communication packet transmitted from the user terminal device 101 to the video delivery server 105 indicates a request.

When a communication is encrypted, a communication packet transmitted from the user terminal device 101 to the video delivery server 105 may be assumed to be a request, and a time when the communication packet transmitted from the user terminal device 101 to the video delivery server 105 arrives at the communication relay device 103 may be assumed to be a transmission time of the request. In that case, the difference between an arrival time of an i-th communication packet and an arrival time of an (i–1)-th communication packet may be assumed to be a transmission interval between requests.

While an initial burst period and a throttling period are separated based on a transmission interval between requests in the description above, the separation method is not limited to the above. The video delivery server 105 transmits video data (chunk) to the user terminal device 101 as a response to a request transmitted from the user terminal device 101. Accordingly, an initial burst period and a throttling period may be separated based on a transmission interval between responses transmitted by the video delivery server 105. In that case, assuming that a communication packet transmitted from the video delivery server 105 to the user terminal device 101 is a response to a request, a time when the communication packet transmitted from the video delivery server 105 to the user terminal device 101 arrives at the communication relay device 103 may be assumed to be a transmission time of the response, and the difference between an arrival time of an i-th communication packet and an arrival time of an (i−1)-th communication packet may be assumed to be a transmission interval between responses.

The throughput division unit 113 divides a throughput in a video delivery period into a throughput in an initial burst period and a throughput in a throttling period, based on a transmission interval between at least either of requests transmitted from the user terminal device 101 side and responses transmitted from the video delivery server 105 side. For example, the characteristic holding unit 114 holds a threshold value for a transmission interval being "2 seconds." For example, the throughput division unit 113 determines whether a delivery mode is an initial burst or throttling, based on whether or not a transmission interval between requests is equal to or less than the threshold value being 2 seconds. For example, the throughput division unit 113 determines that the delivery mode is an initial burst when the transmission interval between requests is equal to or less than 2 seconds and determines that the delivery mode is throttling when the transmission interval between requests is greater than 2 seconds.

Figure 8A:
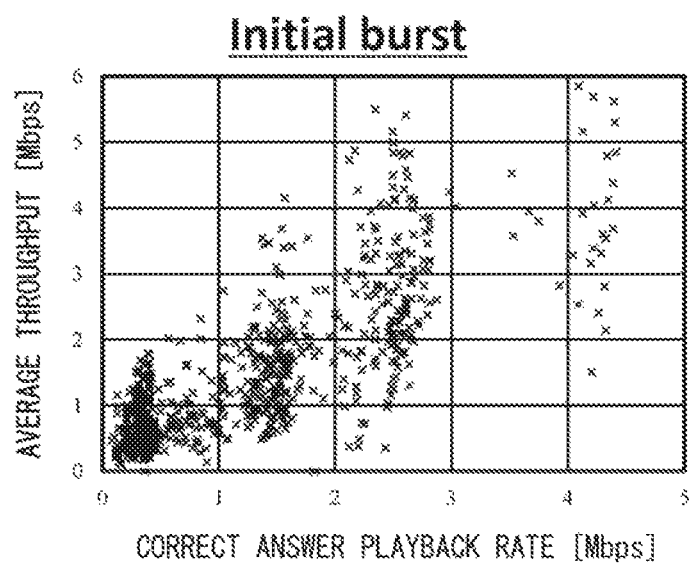
FIG. 8A is a graph illustrating a relation between an actual playback bit rate and a throughput in an initial burst period.
Figure 8B:
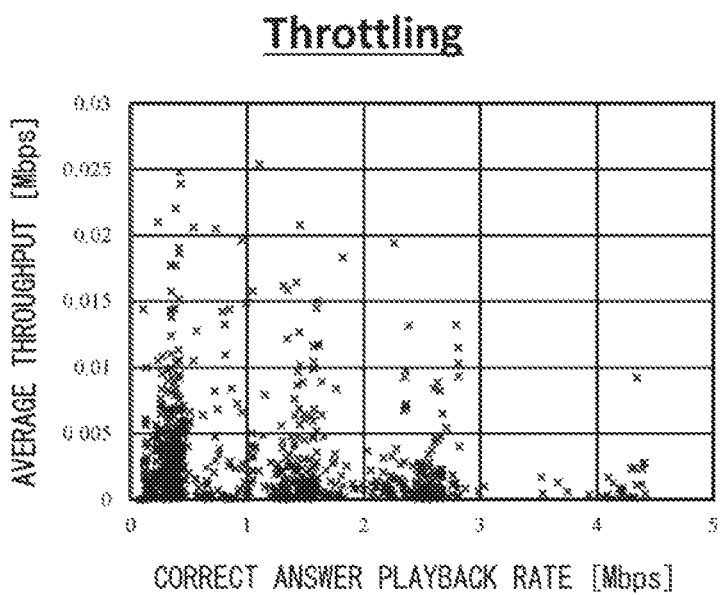
FIG. 8B is a graph illustrating a relation between an actual playback bit rate and a throughput in a throttling period.

FIG. 8A illustrates a relation between an actual playback bit rate and a throughput in an initial burst period, and FIG. 8B illustrates a relation between an actual playback bit rate and a throughput in a throttling period. The present inventors checked a relation between an average value of a throughput divided for each period of a delivery mode and a known playback bit rate (correct answer playback rate) for 1000 video titles, and acquired results illustrated in FIG. 8A and FIG. 8B. In FIG. 8A, the horizontal axis represents a correct answer playback rate, and the vertical axis represents an average throughput in the initial burst period. In FIG. 8B, the horizontal axis represents a correct answer playback rate, and the vertical axis represents an average throughput in the throttling period.

A calculated correlation coefficient between a correct answer playback rate and an average throughput in the result illustrated in FIG. 8A was 0.82. On the other hand, a calculated correlation coefficient between a correct answer playback rate and an average throughput in the result illustrated in FIG. 8B was 0.01. Thus, a throughput in the initial burst period has a relatively high correlation with a correct answer playback rate, whereas a throughput in the throttling period has a low correlation with a correct answer playback rate.

Then, the playback bit rate estimation unit 115 according to the present example embodiment estimates a playback bit rate by use of a throughput in an initial burst period with a high correlation with a correct answer playback rate out of throughputs divided for each delivery period. By estimating a playback bit rate by use of a throughput in a period with a high correlation with a correct answer playback rate out of separated throughputs, estimation precision of a playback bit rate can be improved.

Next, estimation of a medium resolution, a medium length, and playback interruption information will be described. A medium resolution is known to have a correlation with a video bit rate (playback bit rate) (for example, see "bit rate" at https://support.google.com/youtube/answer/1722171?hl=ja). In a case of a video being a standard dynamic range (SDR) video, for example, the parameter estimation unit 116 estimates that a medium resolution is 360 p when a playback bit rate is less than 1 mega bit per second (Mbps). When the playback bit rate is equal to or greater than 1 Mbps and less than 2.5 Mbps, the parameter estimation unit 116 estimates that the medium resolution is 480 p. When the playback bit rate is equal to or greater than 2.5 Mbps and less than 5 Mbps, the parameter estimation unit 116 estimates that the medium resolution is 720 p. When the playback bit rate is equal to or greater than 5 Mbps and less than 8 Mbps, the parameter estimation unit 116 estimates that the medium resolution is 1080 p. When the playback bit rate is equal to or greater than 8 Mbps and less than 16 Mbps, the parameter estimation unit 116 estimates that the medium resolution is 1440 p. When the playback bit rate is equal to or greater than 16 Mbps, the parameter estimation unit 116 estimates that the medium resolution is 2160 p. The parameter estimation unit 116 outputs the estimated medium resolution to the QoE calculation unit 118.

The parameter estimation unit 116 estimates a medium length, based on an estimated playback bit rate and a total received data amount received from the video delivery server 105 by the user terminal device 101. For example, the parameter estimation unit 116 determines a value acquired by dividing a total received data amount by an estimated playback bit rate to be an estimated value of a medium length. However, the total received data amount includes a TCP header, and also the same data are redundantly counted in the total received data amount when TCP retransmission is performed. Furthermore, a transmitted and received data amount also includes audio data. Accordingly, received data also include data other than video data. Then, the parameter estimation unit 116 may determine a value acquired by multiplying a value acquired by dividing a total received data amount by an estimated playback bit rate by a predetermined coefficient less than 1 to be an estimated value of a medium length. For example, an examination performed by the present inventors has confirmed that use of ⅔ as the predetermined coefficient improves estimation precision of an estimated value of a medium length. The parameter estimation unit 116 outputs the estimated value of the medium length to the QoE calculation unit 118.

The parameter estimation unit 116 determines whether or not a playback interruption occurs, based on the medium length estimated above and a communication time (download time) in delivery of the video data. For example, the parameter estimation unit 116 determines that a playback interruption does not occur when the estimated medium length is equal to or greater than the download time. The parameter estimation unit 116 determines that a playback interruption occurs when the download time is greater than the estimated medium length. When determining that a playback interruption occurs, the parameter estimation unit 116 estimates the time acquired by subtracting the estimated medium length from the download time to be a playback interruption time length.

After estimating the playback interruption time length, the parameter estimation unit 116 estimates the number of playback interruptions. For example, the parameter estimation unit 116 calculates an estimated value of the number of playback interruptions by use of a previously set maximum value of a playback interruption time per interruption. For example, assuming the maximum value of a playback interruption time per interruption to be 10 seconds, the parameter estimation unit 116 may determine a value calculated as a playback interruption time length/(10+1) to be an estimated value of the number of playback interruptions. In that case, an average playback interruption time per interruption can be calculated by dividing the playback interruption time length by the estimated value of the number of playback interruptions. The parameter estimation unit 116 outputs the number of playback interruptions and the playback interruption time length to the QoE calculation unit 118 as playback interruption information.

Figure 9:
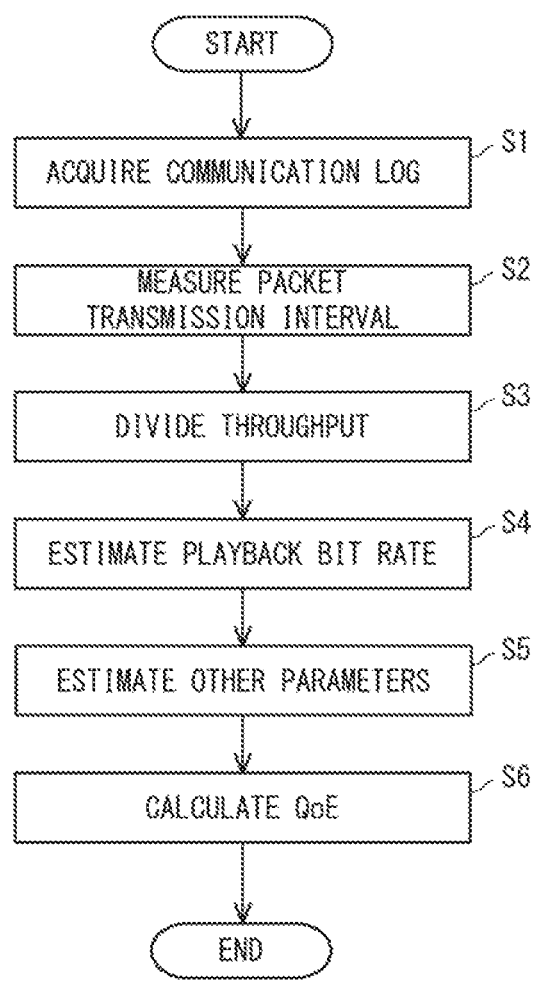
FIG. 9 is a flowchart illustrating a procedure of QoE calculation including playback bit rate estimation.

Next, an operation procedure will be described. FIG. 9 illustrates a procedure of QoE calculation including estimation of a playback bit rate. The communication log acquisition unit 112 (see FIG. 4) acquires a communication log of a communication between the user terminal device 101 and the video delivery server 105 from the communication log storage unit 106 (Step S1). The throughput division unit 113 refers to the communication log acquired in Step S1 and measures, for example, a transmission interval between communication packets transmitted from the user terminal device 101 to the video delivery server 105 (Step S2). In Step S2, for example, the throughput division unit 113 measures the transmission interval by assuming a time when a communication packet transmitted from the user terminal device 101 to the video delivery server 105 arrives at the communication relay device 103 (see FIG. 3) to be a transmission time of the communication packet.

Based on the transmission interval measured in Step S2, the throughput division unit 113 divides a throughput in a video delivery period for each delivery mode (Step S3). For example, the throughput division unit 113 refers to a threshold value "2 seconds" held by the characteristic holding unit 114 and divides a throughput with a packet transmission interval equal to or less than 2 seconds as a throughput in an initial burst period. For example, the video playback bit rate estimation device 111 has a list of servers delivering video data in a plurality of delivery modes, in an unillustrated storage device, and for example, the throughput division unit 113 may perform throughput division in Step S3 when the video delivery server 105 is included in the list.

Based on the throughputs divided in Step S3, the playback bit rate estimation unit 115 estimates a playback bit rate of the video data (Step S4). For example, the playback bit rate estimation unit 115 determines an average value of throughputs in the initial burst period to be an estimated value of a playback bit rate. Based on the playback bit rate estimated in Step S4, the parameter estimation unit 116 estimates a medium resolution, a medium length, and playback interruption information (Step S5).

The QoE calculation unit 118 calculates video QoE, based on the playback bit rate estimated in Step S4, the medium resolution, the medium length, and the playback interruption information that are estimated in Step S5, and a terminal resolution acquired by the terminal resolution acquisition unit 117 (Step S5). In Step S5, for example, the QoE calculation unit 118 calculates video QoE in accordance with a quality of experience model of a user during video browsing, the model being defined by ITU-T Recommendation P.1203.

For example, the QoE calculated by the QoE calculation unit 118 is displayed on an unillustrated display device. A network administrator or the like can grasp changes in QoE over time or the like by, for example, viewing QoE displayed on the display device on a time-series basis.

Figure 10A:
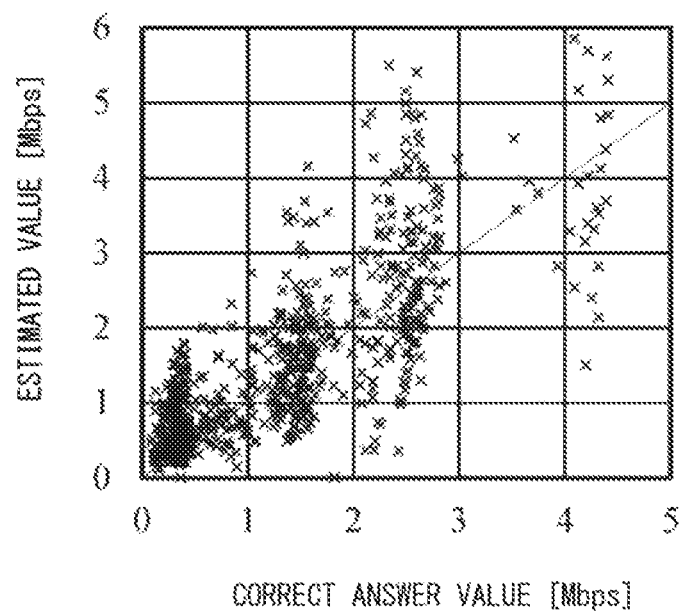
FIG. 10A is a graph illustrating a relation between an estimated value of a playback bit rate and an actual playback bit rate.
Figure 10B:
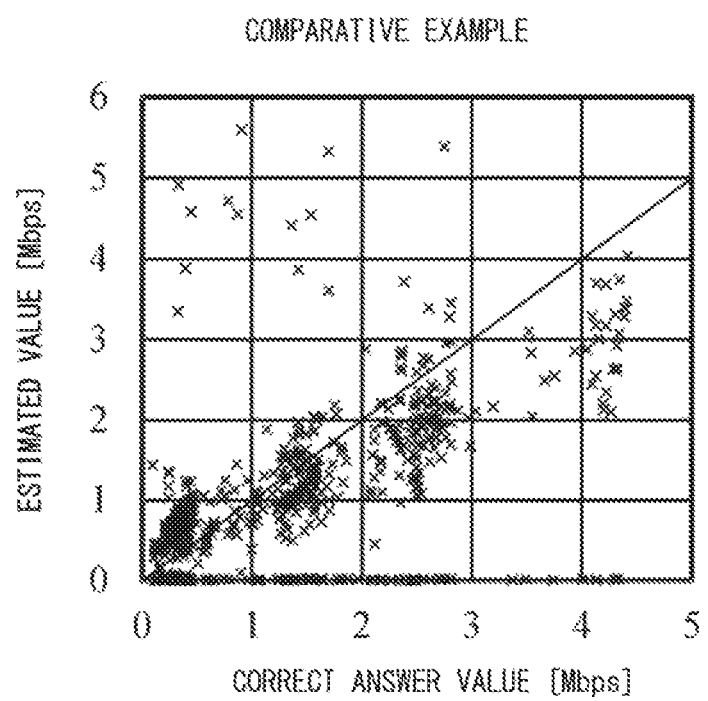
FIG. 10B is a graph illustrating a relation between an estimated value of a playback bit rate and an actual playback bit rate.

Each of FIG. 10A and FIG. 10B illustrates a relation between an estimated value of a playback bit rate and an actual playback bit rate. FIG. 10A illustrates a relation between an estimated value of a playback bit rate and an actual playback bit rate (correct answer value) when the playback bit rate is estimated based on an average throughput in an initial burst period. FIG. 10B illustrates a relation between an estimated value of a playback bit rate and a correct answer value when the playback bit rate is estimated based on an average throughput in a video delivery period as a comparative example.

Determining an average and a standard deviation of absolute errors between an estimated value of a playback bit rate and a correct answer value in the result illustrated in FIG. 10A, the average absolute error is 0.45 Mbps, and the standard deviation is 0.67 Mbps. On the other hand, determining an average and a standard deviation of absolute errors between an estimated value of a playback bit rate and a correct answer value in the comparative example illustrated in FIG. 10B, the average absolute error is 0.67 Mbps, and the standard deviation is 1.31 Mbps. From the result, it is confirmed that the present example embodiment allows more precise estimation of a playback bit rate compared with the comparative example.

The video delivery server 105 according to the present example embodiment delivers video data in a plurality of delivery modes. The throughput division unit 113 divides a throughput in a video delivery period, according to each delivery mode. For example, the throughput division unit 113 according to the present example embodiment divides a throughput for each delivery mode, based on a characteristic of communication traffic. By dividing a throughput according to a characteristic of communication traffic that may vary by delivery mode, a throughput can be divided for each delivery mode even when a communication is encrypted and a communication log acquirable by the communication relay device 103 does not tell a communication content.

The playback bit rate estimation unit 115 according to the present example embodiment estimates a playback bit rate of video data, based on a throughput divided according to each delivery mode. The playback bit rate estimation unit 115 according to the present example embodiment estimates a playback bit rate particularly by use of a throughput in a period of a delivery mode in which a correlation between an average throughput and an actual playback bit rate is high, out of divided throughputs. Thus, estimation precision of a video playback bit rate at the user terminal device can be improved.

The QoE calculation unit 118 calculates video QoE by use of a playback bit rate estimated by the playback bit rate estimation unit 115. According to the present example embodiment, a playback bit rate is estimated by use of a communication log acquirable at the communication relay device 103, and video QoE of a user can be estimated on the carrier side where a communication content cannot be viewed.

Next, a second example embodiment of the present invention will be described. A configuration of a communication quality measurement device used in the second example embodiment is similar to the configuration of the communication quality measurement device 110 illustrated in FIG. 4. The playback bit rate estimation unit 115 according to the first example embodiment estimates a playback bit rate by use of a throughput in an initial burst period out of divided throughputs. A playback bit rate estimation unit 115 according to the present example embodiment estimates a playback bit rate by performing weighted addition on throughputs in periods of delivery modes. The other aspects may be similar to those of the first example embodiment.

For example, denoting a as a value equal to or greater than 0 and equal to or less than 1, the playback bit rate estimation unit 115 weights an average throughput in an initial burst period by α, weights an average throughput in a throttling period by (1−α), and determines the result of weighted addition of the two to be an estimated value of a playback bit rate. In other words, an estimated value of a playback bit rate is calculated by playback bit rate=(average throughput in initial burst)×α+(average throughput in throttling)×(1−α).

For example, the playback bit rate estimation unit 115 may perform weighted addition on throughputs in periods of the respective delivery modes with each weight based on a correlation coefficient between a throughput in each delivery mode and an actual playback bit rate (correct answer playback rate). Specifically, for example, a correlation coefficient between an average throughput and a correct answer playback rate may be previously calculated for both of an initial burst and throttling (also see FIG. 8A and FIG. 8B), and weighted addition may be performed by use of a weight α acquired by α=(correlation coefficient in initial burst)/[(correlation frequency in initial burst)+(correlation coefficient in throttling)].

According to the present example embodiment, a playback bit rate is estimated by performing weighted addition on throughputs divided according to delivery modes. It is considered that a proportion of a throughput in a delivery mode with a high correlation coefficient within the estimated value of the playback bit rate can be increased particularly by performing weighted addition on throughputs in periods of the respective delivery modes with weights based on correlation coefficients, and estimation precision of the playback bit rate can be improved. The other effects are similar to those of the first example embodiment.

Figure 11:
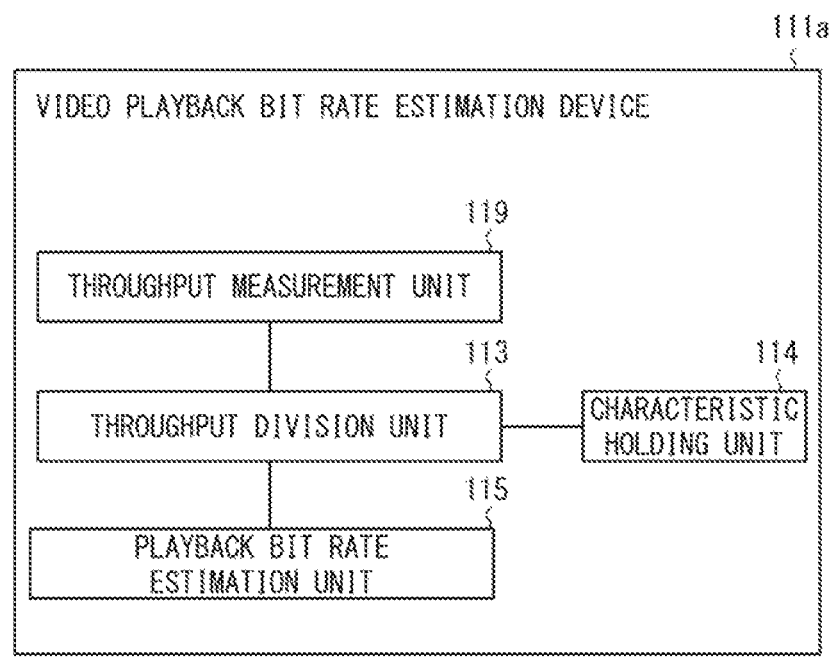
FIG. 11 is a block diagram illustrating a video playback bit rate estimation device according to a third example embodiment of the present invention.

Next, a third example embodiment of the present invention will be described. FIG. 11 illustrates a video playback bit rate estimation device according to the third example embodiment. The video playback bit rate estimation device 111a according to the present example embodiment includes a throughput division unit 113, a characteristic holding unit 114, a playback bit rate estimation unit 115, and a throughput measurement unit 119. The present example embodiment mainly differs from the first example embodiment in replacing the communication log acquisition unit 112 (FIG. 4) in the video throughput estimation device 111 described in the first example embodiment with the throughput measurement unit 119.

The throughput measurement unit 119 measures a throughput of a communication flowing through a network between a user terminal device 101 and a video delivery server 105 for a certain time. For example, the throughput measurement unit 119 measures a throughput at every certain time in real time. The throughput division unit 113 according to the present example embodiment has a function of determining switching between delivery modes. For example, the throughput division unit 113 determines switching between delivery modes, based on a characteristic of communication traffic between the user terminal device 101 and the video delivery server 105.

For example, the throughput division unit 113 determines whether or not a delivery mode is switched from a first delivery mode to a second delivery mode by use of a characteristic held by the characteristic holding unit 104. For example, the characteristic holding unit 104 holds "2 seconds" as a threshold value of a transmission interval, and the throughput division unit 113 determines that the delivery mode is switched from an initial burst to throttling when a packet transmission interval becomes greater than 2 seconds.

Out of throughputs measured by the throughput measurement unit 119, for example, the throughput division unit 113 outputs a throughput measured in an initial burst period to the playback bit rate estimation unit 114 (in a divided manner). The playback bit rate estimation unit 114 estimates a playback bit rate, based on the throughput measured in the initial burst period, similarly to the first example embodiment.

Alternatively, the throughput division unit 113 may output, to the playback bit rate estimation unit 114, the throughput being measured by the throughput measurement unit 119 and being added with a determination result of the delivery mode. In that case, the playback bit rate estimation unit 114 may estimate a playback bit rate by performing weighted addition on throughputs in periods for the respective delivery modes, similarly to the second example embodiment.

The throughput measurement unit 119 according to the present example embodiment measures a throughput of a communication between the user terminal device 101 and the video delivery server 105. The throughput division unit 113 determines switching between delivery modes and outputs, for example, a throughput in a period of a delivery mode with a high correlation with a playback bit rate to the playback bit rate estimation unit 118. Thus, estimation precision of a video playback bit rate can be improved, similarly to the first example embodiment. Further, according to the present example embodiment, a playback bit rate of video data can be estimated without referring to a communication log, and real-time performance in playback bit rate estimation and QoE calculation can be improved.

While an example of a network connected to the user terminal device 101 being the wireless network 107 (see FIG. 2) has been described in each of the aforementioned example embodiments, the network is not limited to the example above. A network type connected to the user terminal device 101 is not particularly limited, and the network may be a fixed network (wired network). Further, while an example of the user terminal device 101 being a terminal device connected to a mobile network, such as a cellular phone, has been mainly described in each of the aforementioned example embodiments, the user terminal device 101 is not limited to such a device. The user terminal device 101 may be equipment connected to the Internet or the like, such as a personal computer or a tablet.

While an example of the throughput division unit 113 dividing a throughput in a period of each delivery mode, based on a transmission interval between communication packets, has been described in the first example embodiment and the third example embodiment, the division method is not limited to the above example. For example, the characteristic holding unit 114 may store a communication traffic pattern in each delivery mode, and the throughput division unit 113 may divide a throughput in a period of each delivery mode by use of pattern matching.

In each of the aforementioned example embodiments, a program causing a computer to operate as the communication quality measurement device 110 and/or the video playback bit rate estimation device 111 may be contained and be supplied to the computer by use of various types of non-transitory computer-readable media. The non-transitory computer-readable media include various types of tangible recording media. Examples of the non-transitory computer-readable media include magnetic recording media (for example, a flexible disk, a magnetic tape, and a hard disk drive), magneto-optical recording media (for example, a magneto-optical disk), a CD-read only memory (ROM), a CD-R, a CD-R/W, and semiconductor memories [for example, a mask ROM, a programmable ROM (PROM), an erasable PROM (EPROM), a flash ROM, and a random access memory (RAM)]. Further, the program may be supplied to the computer by various types of transitory computer-readable media. Examples of the transitory computer-readable media include an electric signal, an optical signal, and an electromagnetic wave. A transitory computer-readable medium may supply the program to the computer through a wired communication channel, such as an electric cable or an optical fiber, or a wireless communication channel.

While the example embodiments of the present invention have been described in detail above, the present invention is not limited to the aforementioned example embodiments, and various changes and modifications made to the aforementioned example embodiments within the scope of the present invention are also included in the present invention.

For example, the aforementioned example embodiments may also be described in part or in whole as the following Supplementary Notes but are not limited thereto.

Supplementary Note 1

A video playback bit rate estimation device including:

a throughput division means for dividing a throughput of a communication between a video delivery server configured to deliver video data to a user terminal device in a plurality of delivery modes and the user terminal device in a delivery period of the video data, according to a period of each delivery mode; and a playback bit rate estimation means for estimating a playback bit rate of the video data, based on a throughput divided according to a period of a delivery mode.

Supplementary Note 2

The video playback bit rate estimation device according to Supplementary Note 1, wherein the throughput division means divides a throughput in the delivery period, according to a period of each delivery mode, based on a characteristic of a pattern of communication traffic between the video delivery server and the user terminal device.

Supplementary Note 3

The video playback bit rate estimation device according to Supplementary Note 2, wherein the throughput division means divides a throughput in the delivery period, according to a period of each delivery mode, with reference to a characteristic holding means for holding a characteristic of the communication traffic for identifying the delivery mode.

Supplementary Note 4

The video playback bit rate estimation device according to any one of Supplementary Notes 1 to 3, wherein the throughput division means at least divides a throughput in a period of a delivery mode with a maximum correlation with an actual video playback rate of the video data, out of the plurality of delivery modes.

Supplementary Note 5

The video playback bit rate estimation device according to any one of Supplementary Notes 1 to 4, wherein the plurality of delivery modes include a first delivery mode in which the video delivery server continuously receives a plurality of video delivery requests from the user terminal device and a second delivery mode in which the video delivery server receives the video delivery requests from the user terminal device at a time interval longer than a time interval at which the video delivery server receives the plurality of video delivery requests in the first delivery mode.

Supplementary Note 6

The video playback bit rate estimation device according to Supplementary Note 5, wherein the video delivery server delivers the video data in the first delivery mode at a start of delivery of the video data and subsequently delivers the video data in the second delivery mode.

Supplementary Note 7

The video playback bit rate estimation device according to Supplementary Note 5 or 6, wherein the throughput division means divides a throughput in the delivery period into a throughput in a period of the first delivery mode and a throughput in a period of the second delivery mode, based on a transmission interval between at least either of packets transmitted from the video delivery server to the user terminal device and packets transmitted from the user terminal device to the video delivery server.

Supplementary Note 8

The video playback bit rate estimation device according to Supplementary Note 7, wherein the throughput division means determines whether the delivery mode is the first delivery mode or the second delivery mode, based on whether or not the transmission interval is equal to or less than a threshold value, and divides a throughput in the delivery period into a throughput in a period of the first delivery mode and a throughput in a period of the second delivery mode.

Supplementary Note 9

The video playback bit rate estimation device according to Supplementary Note 8, wherein the throughput division means determines that the delivery mode is the first delivery mode when the transmission interval is equal to or less than a threshold value and determines that the delivery mode is the second delivery mode when the transmission interval is greater than a threshold value.

Supplementary Note 10

The video playback bit rate estimation device according to any one of Supplementary Notes 1 to 9, further including a communication log acquisition means for acquiring the communication log, wherein the throughput division means divides the throughput, according to a period of each delivery mode, with reference to the communication log.

Supplementary Note 11

The video playback bit rate estimation device according to Supplementary Note 10, wherein the communication log acquisition means acquires the communication log from a communication relay device configured to relay a communication between the video delivery server and the user terminal device.

Supplementary Note 12

The video playback bit rate estimation device according to any one of Supplementary Notes 1 to 9, further including a throughput measurement means for measuring a throughput of a communication between the video delivery server and the user terminal device.

Supplementary Note 13

The video playback bit rate estimation device according to any one of Supplementary Notes 1 to 12, wherein the video data are divided into a plurality of chunks, and the video delivery server delivers the video data to the user terminal device on a per chunk basis.

Supplementary Note 14

The video playback bit rate estimation device according to any one of Supplementary Notes 1 to 13, wherein the playback bit rate estimation means performs weighted addition on a throughput in a period of each delivery mode and estimates a playback bit rate.

Supplementary Note 15

The video playback bit rate estimation device according to Supplementary Note 14, wherein the playback bit rate estimation means performs weighted addition on a throughput in a period of each delivery mode with a weight based on a correlation coefficient between a throughput in each delivery mode and an actual video playback rate of the video data.

Supplementary Note 16

A communication quality measurement device including:
a throughput division means for dividing a throughput of a communication between a video delivery server configured to deliver video data to a user terminal device in a plurality of delivery modes and the user terminal device in a delivery period of the video data, according to a period of each delivery mode;
a playback bit rate estimation means for estimating a playback bit rate of the video data, based on a throughput divided according to a period of the delivery mode;
a parameter estimation means for estimating a medium resolution, a medium length, and playback interruption information of the video data, based on the estimated playback bit rate; and
a QoE calculation means for calculating quality of experience (QoE) of a user of the user terminal device by use of the estimated playback bit rate, and the estimated medium resolution, medium length, and playback interruption information.

Supplementary Note 17

The communication quality measurement device according to Supplementary Note 16, further including a terminal resolution acquisition means for acquiring a resolution of a display screen on the user terminal device, based on user agent information included in a packet transmitted by the user terminal device,
wherein the QoE calculation means calculates QoE by further using a resolution of a display screen on the user terminal device.

Supplementary Note 18

A video playback bit rate estimation method including:
dividing a throughput of a communication between a video delivery server configured to deliver video data to a user terminal device in a plurality of delivery modes and the user terminal device in a delivery period of the video data, according to a period of each delivery mode; and
estimating a playback bit rate of the video data, based on a throughput divided according to a period of the delivery mode.

Supplementary Note 19

A program causing a computer to execute processing for:
dividing a throughput of a communication between a video delivery server configured to deliver video data to a user terminal device in a plurality of delivery modes and the user terminal device in a delivery period of the video data, according to a period of each delivery mode; and
estimating a playback bit rate of the video data, based on a throughput divided according to a period of the delivery mode.

This application claims priority based on Japanese Patent Application No. 2017-165280 filed on Aug. 30, 2017, the disclosure of which is hereby incorporated by reference thereto in its entirety.

REFERENCE SIGNS LIST

10 VIDEO PLAYBACK BIT RATE ESTIMATION DEVICE
11 THROUGHPUT DIVISION MEANS
12 PLAYBACK BIT RATE ESTIMATION MEANS
100 COMMUNICATION SYSTEM
101 USER TERMINAL DEVICE
102 BASE STATION
103 COMMUNICATION RELAY DEVICE
104 CORE NETWORK
105 VIDEO DELIVERY SERVER
106 COMMUNICATION LOG STORAGE UNIT
110 COMMUNICATION QUALITY MEASUREMENT DEVICE
111 VIDEO PLAYBACK BIT RATE ESTIMATION DEVICE
112 COMMUNICATION LOG ACQUISITION UNIT
113 THROUGHPUT DIVISION UNIT
114 CHARACTERISTIC HOLDING UNIT
115 PLAYBACK BIT RATE ESTIMATION UNIT
116 PARAMETER ESTIMATION UNIT
117 TERMINAL RESOLUTION ACQUISITION UNIT
118 QoE CALCULATION UNIT

The invention claimed is:

1. A video playback bit rate estimation device configured to:
divide a throughput of a communication between a video delivery server configured to deliver video data to a user terminal device in a plurality of delivery modes and the user terminal device in a delivery period of the video data, according to a period of each delivery mode; and
estimate a playback bit rate of the video data, based on the throughput divided according to the period of each delivery mode,
wherein the video playback bit rate estimation device is further configured to:
divide the throughput in the delivery period, according to the period of each delivery mode, based on a first characteristic of a pattern of communication traffic between the video delivery server and the user terminal device; and
divide the throughput in the delivery period, according to the period of each delivery mode, with reference to a second characteristic of the communication traffic for identifying the delivery mode.

2. The video playback bit rate estimation device according to claim 1, the video playback bit rate estimation device is further configured to: acquire a communication log; and
divide the throughput, according to the period of each delivery mode, with reference to the communication log.

3. The video playback bit rate estimation device according to claim 1, the video playback bit rate estimation device is further configured to measure the throughput of a communication between the video delivery server and the user terminal device.

4. The video playback bit rate estimation device according to claim 1, wherein the video data are divided into a plurality of chunks, and the video delivery server delivers the video data to the user terminal device on a per chunk basis.

5. The video playback bit rate estimation device according to claim 1, wherein the video playback bit rate estimation device is further configured to perform weighted addition on the throughput in the period of each delivery mode and estimates a playback bit rate.

6. A video playback bit rate estimation device configured to:
divide a throughput of a communication between a video delivery server configured to deliver video data to a user terminal device in a plurality of delivery modes and the user terminal device in a delivery period of the video data, according to a period of each delivery mode; and estimate a playback bit rate of the video data, based on the throughput divided according to the period of each delivery mode, wherein the video playback bit rate estimation device is further configured to at least divide the throughput in the period of the delivery mode having a maximum correlation with an actual video playback rate of the video data, out of the plurality of delivery modes.

7. A video playback bit rate estimation device configured to:

divide a throughput of a communication between a video delivery server configured to deliver video data to a user terminal device in a plurality of delivery modes and the user terminal device in a delivery period of the video data, according to a period of each delivery mode; and estimate a playback bit rate of the video data, based on the throughput divided according to the period of each delivery mode, wherein the plurality of delivery modes include a first delivery mode in which the video delivery server continuously receives a plurality of video delivery requests from the user terminal device and a second delivery mode in which the video delivery server receives the video delivery requests from the user terminal device at a time interval longer than another time interval at which the video delivery server receives the plurality of video delivery requests in the first delivery mode.

8. The video playback bit rate estimation device according to claim 7, wherein the video delivery server delivers the video data in the first delivery mode at a start of delivery of the video data and subsequently delivers the video data in the second delivery mode.

9. The video playback bit rate estimation device according to claim 7, wherein the video playback bit rate estimation device is further configured to divide the throughput in the delivery period into a first throughput in the period of the first delivery mode and a second throughput in the period of the second delivery mode, based on a transmission interval between at least either of first packets transmitted from the video delivery server to the user terminal device and second packets transmitted from the user terminal device to the video delivery server.

10. The video playback bit rate estimation device according to claim 9, wherein the video playback bit rate estimation device is further configured to determine whether each delivery mode is the first delivery mode or the second delivery mode, based on whether or not the transmission interval is equal to or less than a threshold value, and divide the throughput in the delivery period into the first throughput in the period of the first delivery mode and the second throughput in the period of the second delivery mode.

11. The video playback bit rate estimation device according to claim 10, wherein the video playback bit rate estimation device is further configured to determine that each delivery mode is the first delivery mode when the transmission interval is equal to or less than the threshold value and determines that each delivery mode is the second delivery mode when the transmission interval is greater than the threshold value.

12. A video playback bit rate estimation device configured to:

divide a throughput of a communication between a video delivery server configured to deliver video data to a user terminal device in a plurality of delivery modes and the user terminal device in a delivery period of the video data, according to a period of each delivery mode; and estimate a playback bit rate of the video data, based on the throughput divided according to the period of each delivery mode, wherein the video playback bit rate estimation device is further configured to:

acquire a communication log from a communication relay device configured to relay a communication between the video delivery server and the user terminal device; and divide the throughput, according to the period of each delivery mode, with reference to the communication log.

13. A video playback bit rate estimation device configured to:

divide a throughput of a communication between a video delivery server configured to deliver video data to a user terminal device in a plurality of delivery modes and the user terminal device in a delivery period of the video data, according to a period of each delivery mode;

perform weighted addition on the throughput in the period of each delivery mode with a weight based on a correlation coefficient between the throughput in each delivery mode and an actual video playback rate of the video data; and estimate a playback bit rate of the video data, based on the throughput divided according to the period of each delivery mode.

14. A communication quality measurement device configured to:

divide a throughput of a communication between a video delivery server configured to deliver video data to a user terminal device in a plurality of delivery modes and the user terminal device in a delivery period of the video data, according to a period of each delivery mode;

estimate a playback bit rate of the video data, based on the throughput divided according to the period of each delivery mode;

estimate a medium resolution, a medium length, and playback interruption information of the video data, based on the estimated playback bit rate; and calculate quality of experience (QoE) of a user of the user terminal device by use of the estimated playback bit rate, and the estimated medium resolution, the estimated medium length, and the estimated playback interruption information, wherein the communication quality measurement device is further configured to:

acquire a resolution of a display screen on the user terminal device, based on user agent information included in a packet transmitted by the user terminal device; and calculate the QoE by further using the resolution of the display screen on the user terminal device.

15. A video playback bit rate estimation method comprising:

dividing a throughput of a communication between a video delivery server configured to deliver video data to a user terminal device in a plurality of delivery modes and the user terminal device in a delivery period of the video data, according to a period of each delivery mode, based on a characteristic of a pattern of communication traffic between the video delivery server and the user terminal device and with reference to a characteristic of the communication traffic for identifying the delivery mode; and estimating a playback bit rate of the video data, based on the throughput divided according to the period of each delivery mode.

\* \* \* \* \*